(12) United States Patent
Wang et al.

(10) Patent No.: US 8,010,611 B2
(45) Date of Patent: Aug. 30, 2011

(54) METHOD FOR PROCESSING DEFERRED MESSAGE

(75) Inventors: Jue Wang, Shenzhen (CN); Lunjian Mu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1358 days.

(21) Appl. No.: 11/548,384

(22) Filed: Oct. 11, 2006

(65) Prior Publication Data

US 2007/0203995 A1    Aug. 30, 2007

(30) Foreign Application Priority Data

Oct. 11, 2005  (CN) .......................... 2005 1 0112565

(51) Int. Cl.
  *H04M 1/663*  (2006.01)
  *H04Q 7/20*  (2006.01)
  *G06F 15/16*  (2006.01)
(52) U.S. Cl. ........ 709/206; 709/207; 709/218; 709/219; 455/466; 455/412.2
(58) Field of Classification Search .................. 709/206, 709/207, 219, 203, 218; 455/412.2, 466
  See application file for complete search history.

(56) References Cited

U.S. PATENT DOCUMENTS

| | | | | |
|---|---|---|---|---|
| 7,305,069 | B1 * | 12/2007 | Day .............................. | 379/88.13 |
| 7,529,813 | B2 * | 5/2009 | Lim et al. ...................... | 709/219 |
| 7,561,595 | B2 * | 7/2009 | Garcia-Martin et al. ..... | 370/465 |
| 7,580,719 | B2 * | 8/2009 | Karmarkar .................... | 455/466 |
| 7,725,098 | B1 * | 5/2010 | Claudatos et al. ............ | 455/411 |
| 2002/0131395 | A1 * | 9/2002 | Wang ............................ | 370/349 |
| 2004/0152477 | A1 | 8/2004 | Wu et al. | |
| 2006/0004914 | A1 * | 1/2006 | Kelly et al. ................... | 709/219 |
| 2007/0067324 | A1 * | 3/2007 | Burkhardt ..................... | 707/101 |
| 2007/0076751 | A1 * | 4/2007 | Garcia-Martin et al. ..... | 370/466 |
| 2007/0078935 | A1 * | 4/2007 | Garcia-Martin et al. ..... | 709/206 |
| 2007/0226295 | A1 * | 9/2007 | Haruna et al. ................. | 709/204 |
| 2008/0059579 | A1 * | 3/2008 | Maes ............................ | 709/204 |
| 2008/0113679 | A1 * | 5/2008 | Sung et al. .................... | 455/466 |

(Continued)

FOREIGN PATENT DOCUMENTS

CN    1404288    3/2003

(Continued)

OTHER PUBLICATIONS

International Search Report for PCT/CN2006/001600, dated Nov. 9, 2006.

*Primary Examiner* — Lisa Hashem

(57) ABSTRACT

A method for processing deferred messages includes a storing process, a notification process and a retrieving process of a deferred message. In the storing process, when a user presets and requires to store the deferred message, the system stores the deferred message to be sent to the user; in the notification process, when a user gets online, an IM server at the client side detects the system has stored the deferred message for the user and if the user has subscribed the deferred message notification, the system sends the deferred message notification to the client according to the setting of the system or of the user; in the retrieving process, when the client receives the deferred message notification and requests to acquire the deferred message, its IM server sends the deferred message content to the client. The present invention improves the method for processing deferred messages in the SIP/SIMPLE IM service system.

32 Claims, 10 Drawing Sheets

U.S. PATENT DOCUMENTS

| | | | |
|---|---|---|---|
| 2009/0125803 A1* | 5/2009 | Bao et al. | 715/235 |
| 2009/0129388 A1* | 5/2009 | Akhtar et al. | 370/392 |
| 2009/0249348 A1* | 10/2009 | Xu et al. | 718/102 |
| 2009/0279455 A1* | 11/2009 | Wang et al. | 370/260 |
| 2009/0282118 A1* | 11/2009 | Garcia-Martin et al. | 709/206 |
| 2010/0197329 A1* | 8/2010 | Claudatos et al. | 455/466 |
| 2010/0235762 A1* | 9/2010 | Laiho et al. | 715/753 |
| 2010/0255865 A1* | 10/2010 | Karmarkar | 455/466 |
| 2010/0325221 A1* | 12/2010 | Cohen et al. | 709/206 |
| 2011/0014933 A1* | 1/2011 | Karmarkar et al. | 455/466 |
| 2011/0035442 A1* | 2/2011 | Hjelm et al. | 709/203 |

FOREIGN PATENT DOCUMENTS

| | | | |
|---|---|---|---|
| CN | 1642148 | | 7/2005 |
| EP | 05008496.1 | * | 4/2005 |
| WO | WO 03/107621 A1 | | 12/2003 |
| WO | WO 2005/046192 A1 | | 5/2005 |
| WO | WO2005/046192 A1 | * | 5/2005 |

* cited by examiner

METHOD FOR PROCESSING DEFERRED MESSAGE

RELATED APPLICATIONS

This patent application makes reference to, claims priority to and claims benefit from Chinese Patent Application No. 200510112565.X filed on Oct. 11, 2005, which is explicitly incorporated herein by reference in its entirety.

FEDERALLY SPONSORED RESEARCH OR DEVELOPMENT

[Not Applicable]

FIELD OF THE INVENTION

The present invention relates generally to communication techniques, and more particularly to a method for processing deferred messages in an instant message system under Session Initiated Protocol (SIP)/Instant Message and Presence Leveraging Extensions (SIMPLE) protocol.

BACKGROUND OF THE INVENTION

The instant message (IM) service is a kind of person-to-person or person-to-group message-type mobile data service based on the Presence and can be applied to mobile communication networks and the Internet. The mobile communication networks include current 2G network, 2.5 G network, future 3G network, IP Multimedia Subsystem (IMS) and the like.

Generally, there are two types of IM systems in the current industrial specifications. One is Wireless Village (WV) based, which is carried on Hyper Text Transport Protocol (HTTP)/Wireless Access Protocol (WAP)/Short Message Service Protocol (SMS) and supports 2.5G/3G network, and the other is SIP/SIMPLE based, which is carried on SIP/SIMPLE and supports IMS-based IP network.

In the IM system based on SIP/SIMPLE, it is desired that when a sender sends an instant message to a receiver who is offline, the IM server of the receiver selects whether it is necessary to store the deferred message according to user configuration and system configuration (i.e., whether the deferred message needs to be stored and retrieved and whether the function for supporting deferred message is provided, etc.). If the deferred message is stored, when the receiver registers to the SIP/IP core network and logs in the server of the receiver, the IM server can show the receiver a deferred message notification and if the receiver would like to obtain the details of one or more messages, the receiver may send a retrieving request to the server and then the server will issue the details of the selected messages to the receiver.

BRIEF SUMMARY OF THE INVENTION

In one aspect, the presently described technology provides a method for processing deferred messages, which is applicable in an instant message (IM) system under Session Initiated Protocol (SIP)/Instant Message and Presence Leveraging Extensions (SIMPLE). The method of the presently described technology includes storing the deferred messages, notifying of the deferred messages and retrieving the deferred messages.

Particularly, the step of storing the deferred messages can include: storing, by the IM system, the deferred messages to be sent to a user in a case that the user pre-requests for storing the deferred messages. The step of notifying of the deferred messages can include: determining there are deferred messages for the user stored in the IM system by an IM server associated with a client of the user when the user gets online, and sending a deferred message notification to the client of the user under subscribed configuration in a case that the user subscribes the deferred message notification, or otherwise, sending the deferred message notification to the client under default setting of the IM system. And the step of retrieving the deferred messages can include: sending the deferred messages to the client by the IM server by request from the client for retrieving the deferred messages after receiving the deferred message notification.

According to at least one embodiment of the present technology, the deferred messages include meta-data and content, and the meta-data and the content can be combined and stored in a single storage entity or stored separately in different storage entities in the step of storing the deferred messages.

According to at least one embodiment of the present technology, if the meta-data and the content of the deferred messages are stored in different storage entities, the meta-data is stored in an IM Extensible Markup Language Document Management Server entity (IM XDMS entity) and the content is stored in a deferred message content storage entity.

According to at least one embodiment of the present technology, when the user subscribes the deferred message notification, the client of the user can initiate a SIP SUBSCRIBE request message for subscribing the deferred message notification to the respective IM server, the respective IM server authenticates the user, and if the user is authenticated, the IM server can send a SIP NOTIFY message to the client of the user. The SIP NOTIFY message can include a current deferred message status and the deferred message notification for the user.

According to at least one embodiment of the present technology, the SIP SUBSCRIBE request message can include a subscription event package, in which a deferred message notification content is set. The deferred message notification content may include, for example, deferred message list information and deferred message meta-data.

According to at least one embodiment of the present technology, the SIP SUBSCRIBE request message can include a deferred message notification time. The deferred message notification time can include, for example, sending the deferred message notification each time the client gets online during a specified period or sending the deferred message notification once only after subscription.

According to at least one embodiment of the present technology, if the user subscribes the deferred message notification, the respective IM server sends the deferred message notification in a SIP NOTIFY message; otherwise, the respective IM server sends the deferred message notification in a SIP MESSAGE under default setting of the IM system. If the IM server sends the deferred message notification in a SIP MESSAGE under default setting of the IM system, the IM system can send the deferred message notification, for example, at a preset time or periodically or once only after the client gets online.

According to at least one embodiment of the present technology, the deferred message notification content can include deferred message list information and deferred message meta-data or a deferred message content.

For example, if the meta-data and the content are combined and stored in a single storage entity and the user subscribes the deferred message notification, when the client of the user gets online, the IM server can query and retrieve the meta-data for the user from the storage entity through a database interface; and then the IM server can construct a deferred message list in accordance with a query result and send the deferred message notification to the client of the server by a SIP NOTIFY message carrying the deferred message list and the deferred message meta-data.

For another example, if the meta-data and the content are combined and stored in a single storage entity but the user does not subscribe the deferred message notification, when the client of the user gets online, the IM server can query and retrieve the meta-data for the user from the storage entity through a database interface under default setting of the system; and then the IM server can construct a deferred message list in accordance with a query result and send the deferred message notification to the client of the server by a SIP MESSAGE carrying the deferred message list and the deferred message meta-data.

According to at least one embodiment of the present technology, if the deferred message meta-data is stored in an IM XDMS entity and the user subscribes the deferred message notification, when the client of the user gets online, the IM server can query and retrieve the deferred message meta-data for the user from the IM XDMS entity through an IM-3 interface; and then the IM server can construct a deferred message list in accordance with a query result and send the deferred message notification to the client of the server by a SIP NOTIFY message carrying the deferred message list and the deferred message meta-data.

On the other hand, if the deferred message meta-data is stored in an IM XDMS entity and the user does not subscribe the deferred message notification, when the client of the user gets online, the IM server can query and retrieve the deferred message meta-data for the user from the IM XDMS entity through an IM-3 interface; and then the IM server can construct a deferred message list in accordance with a query result and send the deferred message notification to the client of the server by a SIP MESSAGE carrying the deferred message list and the deferred message meta-data.

According to at least one embodiment of the present technology, after the client of the user receives the deferred message notification, the client can initiate a deferred message retrieving request which carries an retrieving condition. For example, the client of the user can initiate the deferred message retrieving request through a SIP message, an HTTP message or a Message Session Relay Protocol (MSRP) message in an MSRP channel. The retrieving condition can include, but are not limited to, selecting the deferred messages according to a sender, a sending time, or a subject of the messages or a combination thereof or selecting the deferred messages randomly.

According to at least one embodiment of the present technology, after the IM server receives the deferred message retrieving request, the IM server can send the deferred message content to the client of the user under the retrieving condition. For example, the IM server can send the deferred message content through an SIP message, an HTTP message or an MSRP message in an MSRP channel.

According to at least one embodiment of the present technology, the IM server can incorporate the content of one deferred message in one sending message; or combine the contents of a plurality of deferred messages in one sending message to be sent. In the latter case, the method can require that the contents of the plurality of deferred messages include bytes less than or equal to the maximum bytes supported by the sending message.

According to at least one embodiment of the present technology, if the meta-data and the content of the deferred message are combined and stored in a single storage entity, the IM server can query and retrieve the deferred message content for the user from the deferred message storage entity through a database interface and then send the deferred message content. If the meta-data and the content of the deferred message are stored in different storage entities, the IM server can query and retrieve the deferred message content for the user from the storage entity storing the deferred message content through a database interface and then send the deferred message content.

According to at least one embodiment of the present technology, if the MSRP message is adopted to send the deferred message content, the deferred message content can be sent by an existing or a newly established MSRP channel between the IM server and the client of the user.

For example, when the deferred message content is sent by a newly established MSRP channel, the IM server can retrieve the deferred message content for the user and then establish a new MSRP channel for sending the deferred message content; or after receiving the retrieving request for the deferred message from the client of the user, the IM server can establish an MSRP channel with the client of the user and then retrieve and send the deferred message content for the user.

According to at least one embodiment of the present technology, the step of retrieving the deferred message content for the user and then establishing a new MSRP channel for sending the deferred message content can further include the following steps: (1) after receiving the retrieving request for the deferred message from the client of the user, the IM server queries the deferred message content under the retrieving condition carried in the request and stores the deferred message content locally; (2) the IM server sends an SIP request message to the client of the user and requests to establish an MSRP channel with the client of the user; (3) the client of the user returns an SIP response message to the IM server; and (4) after receiving the SIP response message, the IM server sends an SIP acknowledge message to the client of the user, establishes an MSRP channel with the client of the user and sends the retrieved deferred messages to the client of the user through the MSRP channel. Preferably, when all the deferred messages are sent, the IM server can send a SIP BYE message to the client of the server; and the client of the server can return a response message.

According to at least one embodiment of the present technology, the step of establishing an MSRP channel with the client of the user and then retrieving and sending the deferred message content for the user can further include the steps of: after receiving the retrieving request for the deferred message from the client of the user, the IM server sends an SIP request message and requests to establish an MSRP channel with the client of the user; (2) the client of the user returns an SIP response message to the IM server; (3) after receiving the SIP response message, the IM server sends a SIP acknowledge message to the client of the user, establishes an MSRP channel with the client of the user; and (4) the IM server queries the deferred message content under the retrieving condition carried in the retrieving request for the deferred message and sends the deferred message content to the client of the user through the established MSRP channel. Also preferably, when all the deferred messages are sent, the IM server can send a SIP BYE message to the client of the server; and the client of the server can return a response message.

According to at least one embodiment of the present technology, if the user does not pre-request for storing the deferred messages, when the IM system receives the deferred messages for the user, the system can abandon the deferred messages, or process the deferred messages under default strategy of the IM system.

According to at least one embodiment of the present technology, in the step of retrieving the deferred messages, the IM server can send the deferred messages to the client of the user and the client of the user can send a response message to the respective IM server. Preferably, after receiving the response message from the client of the user, the respective IM server deletes the deferred messages stored in the storage entity that are sent.

In accordance with at least one embodiment of the present technology, after the IM server retrieves the deferred message content for the client of the user from the storage entity, the IM server deletes the retrieved messages from the storage entity.

In accordance with at least another embodiment of the present technology, after the IM server retrieves the deferred message content for the client of the user from the storage entity, the IM server marks the retrieved messages and can delete all the marked deferred messages at a preset time. For example, after the IM server retrieves the deferred message content for the client of the user from the storage entity, the IM server can set a storage time limit for the retrieved deferred messages in the storage entity, and when the storage time limit of the retrieved deferred messages in the system expires, the IM server deletes the deferred messages from the storage entity.

The presently described technology flexibly supports an SIP/SIMPLE IM user to select the deferred message notifying manner, the notification content, the time to obtain the deferred message and the content of the specific deferred message according to different requirements, so that the SIP/SIMPLE IM system can support a complete solution for processing deferred message and provide abundant service experiences for the user. In addition, since the meta-data and the content of the deferred message can be stored in an IM XDMS entity and a storage entity respectively, certain embodiments of the presently described technology enable to retrieve the relating data much more conveniently and support XML Configuration Access Protocol (XCAP). Further, in accordance with at least one embodiment of the presently described technology, the deferred messages that have been sent can be deleted from the system so as to save the system resource.

DETAILED DESCRIPTION OF THE INVENTION

Figure 1:
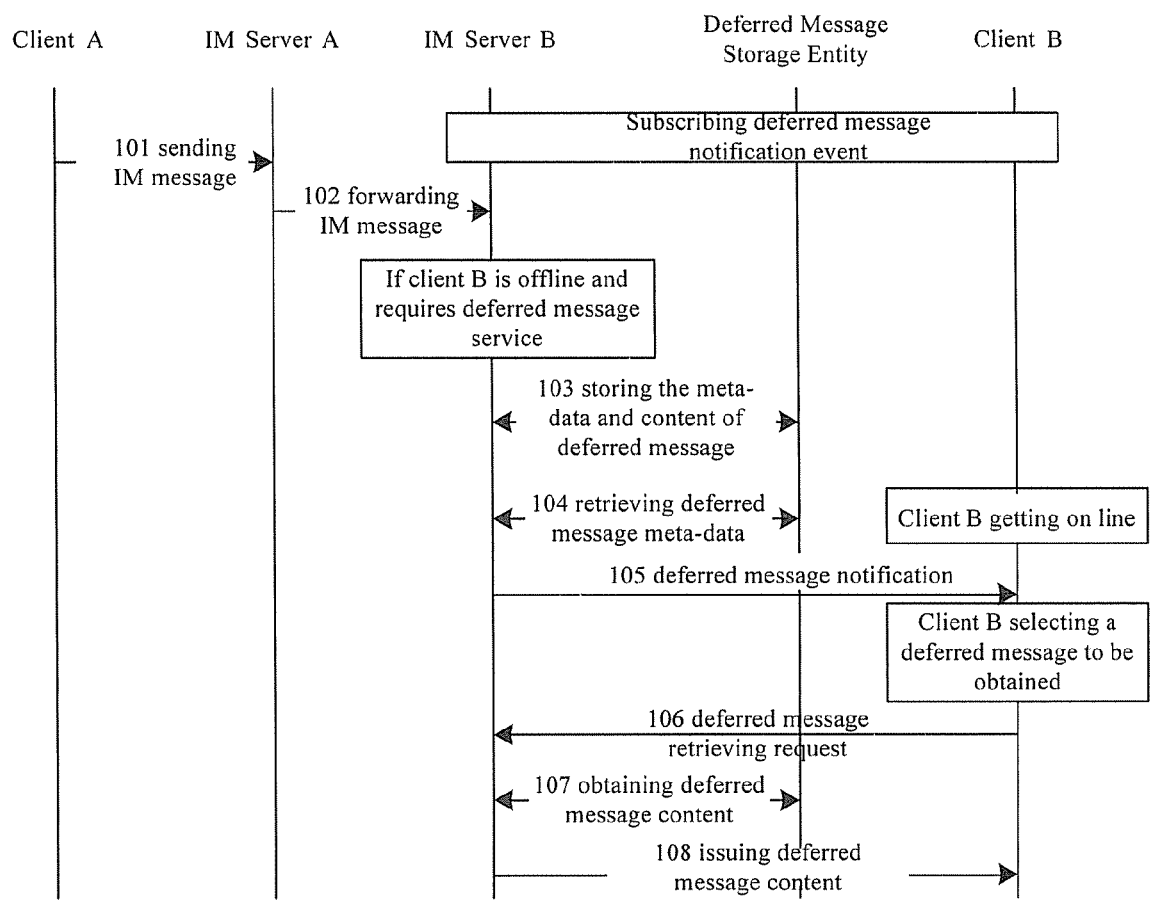
FIG. 1 is a flow chart showing the process of storing, notifying and retrieving deferred messages according to an embodiment of the present invention.

The process in accordance with at least one embodiment of the presently described technology will be first described from a service application aspect. As shown in FIG. 1, client A is the client of a user A (not shown) sending an instant message; IM server A is a server for the client A; client B is the client of a user B (not shown) receiving an instant message; IM server B is a server for the client B; a deferred message storage entity stores the instant message sent from the client A when the client B is off line. Detailed process is as follows.

Step 101. User A desires to send an instant message to the user B and will first send the instant message to the IM server A in the domain thereof.

Step 102. The IM server A judges the user B belongs to the IM server B and sends the instant message to the IM server B.

Step 103. The IM server B determines whether the user B is online, if yes, send the instant message to the user B and the process ends; otherwise, the IM server B determines whether the user B configures to require the deferred message service, if yes, the IM server stores the message content and meta-data (such as sending time, sender, receiver and subject) in the deferred message storage entity.

Step 104. When the user B gets online, the IM server B retrieves the deferred message meta-data stored in the deferred message storage entity.

Step 105. The IM server B issues the deferred message notification to the client B, including the deferred message list and the meta-data.

Step 106. The user B may choose to retrieve one or some of the messages and send a deferred message retrieving request to the IM server B.

Step 107. The IM server B reads the specific deferred message content for the client B from the deferred message storage entity.

Step 108. The IM server B issues the deferred message content to the user and may issue the messages one by one or issue a plurality of messages at one time.

In the above process, it is optional for the client B to subscribe the deferred message notification from the IM server B. The client B may subscribe the deferred message notification from the IM server B at any time after the IM service is available, or may temporarily subscribe the deferred message notification from the IM server B after getting online. If the client B does not subscribe at all, the IM server may provide the deferred message notification function complying with the default setting of the system (strategy of the operator) or may not provide this function.

In the process of subscribing the deferred message notification, the client may choose the notifying manner of the deferred message such as notifying each time the user gets online or notifying only once for this subscription. The client may also choose the notification content such as only including the deferred message list and the deferred message meta-data or choose to directly issue the deferred message content. If the chosen notification content includes the deferred message list and the deferred message meta-data, there will be the proceeding process such as the retrieving request, and issue of the deferred message content. If directly issuing the content is chosen, there will be no subsequent process such as the retrieving request, and issue of the deferred message content (the present invention mainly aims at the case that the notification content includes the deferred message list and the deferred message meta-data).

The user may subscribe the deferred message notification for a long term in advance or subscribe only once after the user gets online. These two subscription flows will be described respectively.

According to one embodiment of the present invention, after retrieving the deferred message content from the deferred message storage entity, the IM server can delete or mark the retrieved deferred message from the deferred message storage entity so as to distinguish which deferred message are retrieved and which are not retrieved and then the IM system can delete all the retrieved deferred messages at a preset time. Of course, the IM server may delete the deferred messages according to the requirement subscribed by the client. For example, when the IM server receives a response from the client B after the client B receives the deferred message, it will delete the deferred message stored in the deferred message storage entity (either deleting immediately or after a period of time). For another example, the IM server may set a corresponding expiration time in the deferred message and when the storage time of the deferred message expires by the time, the deferred message will be deleted from the deferred message storage entity. The above process of deleting the deferred message is a preferred method in the embodiment of the presently described technology, and of course other methods may also be feasible according to the subscription requirement of the IM system or of the client.

Figure 2:
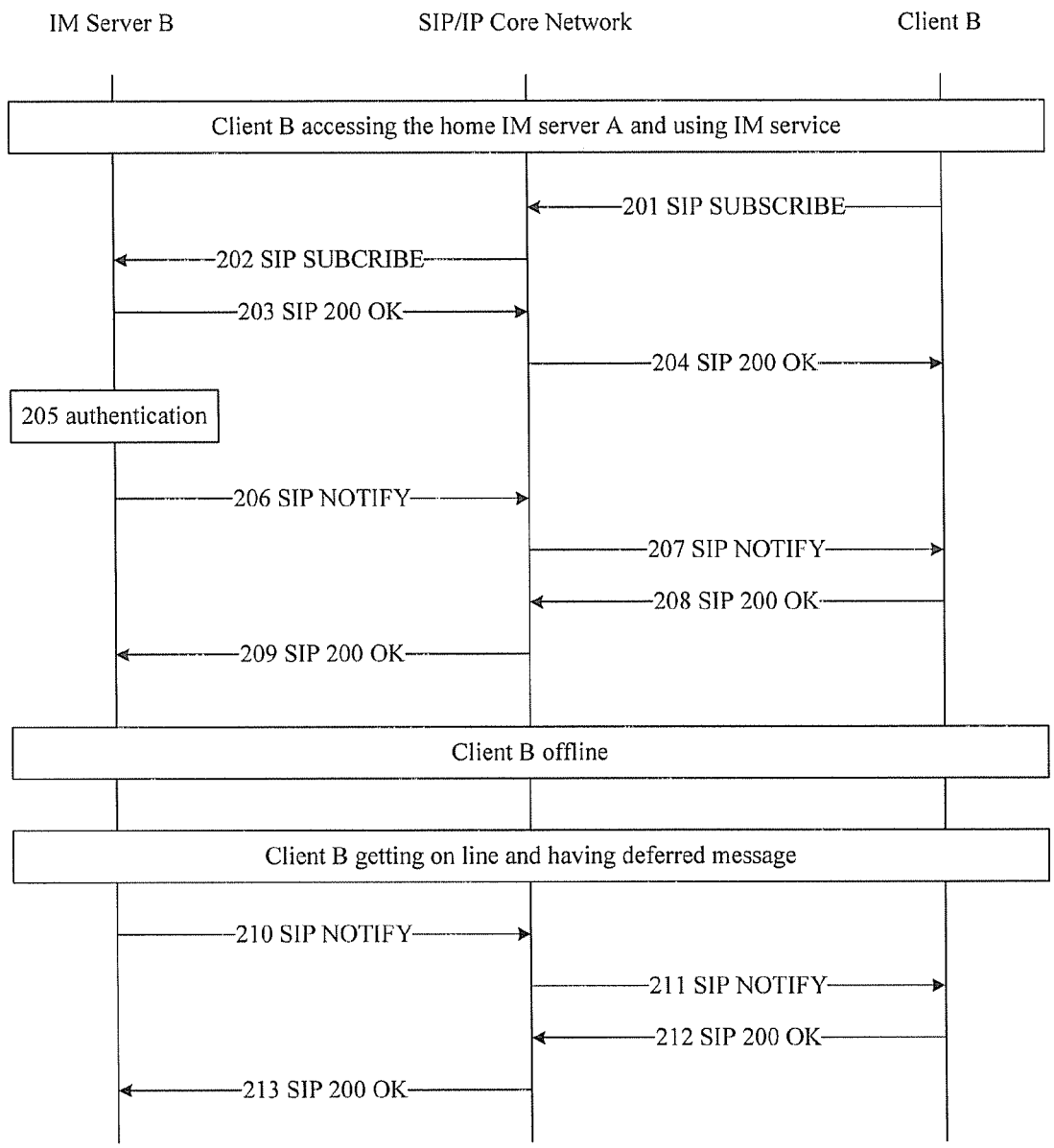
FIG. 2 is a signaling flow chart showing the process that a client of a user receiving the deferred message pre-requests to subscribe a deferred message notification from a server and a notification issues according to an embodiment of the present invention.

FIG. 2 shows a process of a client of the user subscribing the deferred message notification at any time after the IM service is available in accordance with one embodiment of the present technology. Referring to FIG. 2, client B is a client of the user B (not shown) receiving a deferred message; IM server B is a server for the client B; a SIP/IP core network represents the SIP core network of the client B. The specific flow of the process is as follows.

Step 201. The client of the receiving user sends an SIP SUBSCRIBE request to the SIP/IP core network to subscribe the deferred message notification. The SIP URI address of the IM server B is put in the Request URI to show intension to subscribe the event of the IM server B. The time of retrieving the update information notification can be defined in the header of the event package of the message such as defining the user may retrieve the deferred message notification each time he gets online. The notification content may be specified in the message event package such as including the deferred message list and the deferred message meta-data or including the deferred message content. The feature code of the SIP/SIMPLE IM service may be included in the Accept-Contact (name of a standard field in the SIP message header) of the message such as "+g.oma.sip-im".

Step 202. The SIP/IP core network judges the subscription request is for the IM server B according to the URI address and forwards the SIP SUBSCRIBE request to the IM server B.

Step 203. After receiving the SIP SUBSCRIBE request, the IM server B returns an SIP 200 OK message to the SIP/IP core network, to acknowledge receipt of the request.

Step 204. The SIP/IP core network forwards the SIP 200 OK message to the client B.

Step 205. The IM server B authenticates the subscription request by examining the subscribed event, expiration and whether the subscriber has the corresponding permission, and judging whether to allow the client B subscribing the notification when the event happens. If the IM server B gets authenticated (the detailed authentication process is not critical to the present invention and will not be described here), step 206 will be performed.

Step 206. The IM server B sends a first SIP NOTIFY message to the SIP/IP core network. The first SIP NOTIFY message includes current status information, i.e. the deferred message status and the deferred message notification for the client B. If the client B does not have a deferred message, the body of the SIP NOTIFY message is empty.

Step 207. The SIP/IP core network forwards the SIP NOTIFY message to the client B and when the client B receives the first SIP NOTIFY message, the subscription is processed successfully.

Step 208. The client B returns a SIP 200 OK message to the SIP/IP core network.

Step 209. The SIP/IP core network forwards the SIP 200 OK message to the IM server B. Thus, the subscription/notification process ends.

Assuming the user B gets off line after a period of time and then gets online again, when the IM server B detects the user B gets online and finds he has a deferred message and has subscribed the deferred message notification, it will perform the following steps.

Step 210. The IM server B sends a first SIP NOTIFY message to the SIP/IP core network. The first SIP NOTIFY message can include a current deferred message notification.

Step 211. The SIP/IP core network forwards the SIP NOTIFY message to the client B.

Step 212. The client B returns an SIP 200 OK message to the SIP/IP core network, to acknowledge receipt of the notification Step 213. The SIP/IP core network forwards the SIP 200 OK message to the IM server B.

In the above steps, step 205 can be performed immediately after step 203 and has no time sequence with step 204.

Figure 3:
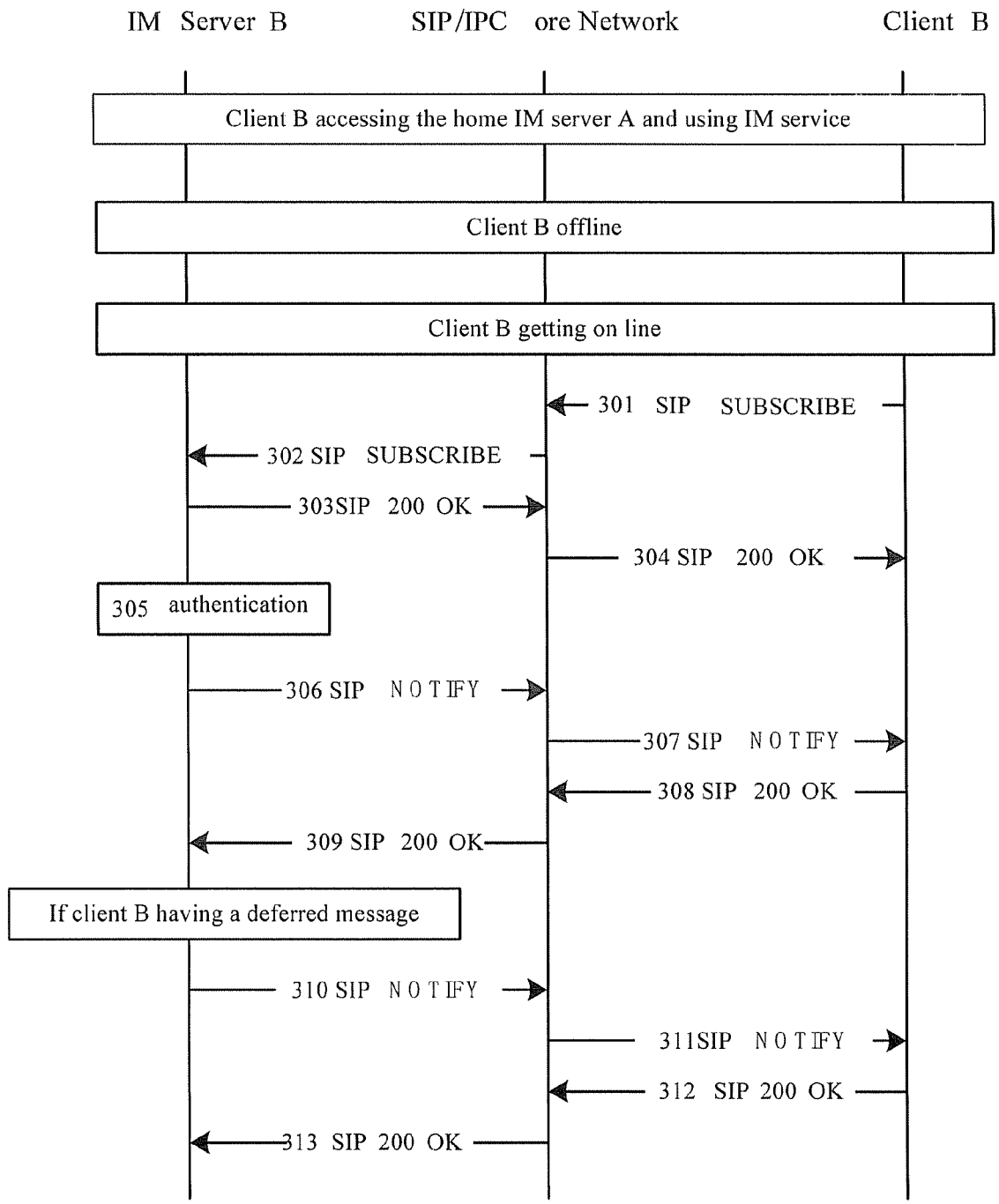
FIG. 3 is a signaling flow chart showing the process that a client of a user receiving the deferred message requests to subscribe a deferred message notification from a server temporarily after getting online, and a notification issues according to an embodiment of the present invention.

When the user needs to subscribe the deferred message notification temporarily, the IM client of the user gets online and sends the deferred message subscription request to the IM server. If the subscription succeeds, and if there is a deferred message, the IM server will issue the deferred message notification. In this case, the notification to the client is only sent once. The specific flow in accordance with one embodiment of the present technology is shown in FIG. 3 and includes the following steps.

Step 301. The client of the receiving user sends a SIP SUBSCRIBE request to the SIP/IP core network to subscribe the deferred message notification. The SIP URI address of the IM server B is put in the Request URI to show it is going to subscribe the event of the IM server B. The time of retrieving the update information notification can be defined in a header of the event package of the message such as defining the deferred message notification only to be retrieved this time. The notification content may be specified in the message event package such as including the deferred message list and the deferred message meta-data or including the deferred message content. The feature code of the SIP/SIMPLE IM service may be included in the Accept-Contact (name of a standard field in the SIP message header) of the message such as the "+g.oma.sip-im".

Step 302. The SIP/IP core network judges the subscription request is for the IM server B according to the URI address and forwards the SIP SUBSCRIBE request to the IM server B.

Step 303. After receiving the SIP SUBSCRIBE request, the IM server B returns a SIP 200 OK message to the SIP/IP core network, to acknowledge receipt of the request.

Step 304. The SIP/IP core network forwards the SIP 200 OK message to the client B.

Step 305. The IM server B authenticates the subscription request by examining the subscribed event, expiration and whether the subscriber has the corresponding permission, and judging whether to allow the client B subscribing the notification when the event happens. If the IM server B gets authenticated, step 306 is performed.

Step 306. The IM server B sends a first SIP NOTIFY message to the SIP/IP core network and the first SIP NOTIFY message includes the current status information, i.e. the deferred message status and the deferred message notification for the client B. If the client B does not have a deferred message, the body of the SIP NOTIFY message is empty.

Step 307. The SIP/IP core network forwards the SIP NOTIFY message to the client B and when the client B receives the first SIP NOTIFY message, the subscription is processed successfully.

Step 308. The client B returns a SIP 200 OK message to the SIP/IP core network.

Step 309. The SIP/IP core network forwards the SIP 200 OK message to the IM server B. If the IM server B has a deferred message, perform the following steps.

Step 310. The IM server B sends a first SIP NOTIFY message to the SIP/IP core network and the SIP NOTIFY message includes a current deferred message notification.

Step 311. The SIP/IP core network forwards the SIP NOTIFY message to the client B.

Step 312. The client B returns the SIP 200 OK message to the SIP/IP core network, to acknowledge receipt of the notification.

Step 313. The SIP/IP core network forwards the SIP 200 OK message to the IM server B.

Similarly, in the above steps, step 305 can be performed immediately after step 303 and has no time sequence with step 304.

The user may not have subscribed the deferred message notification event and in this case whether to provide the user with the deferred message notification function depends on the setting of the operator. For example, if the server is configured to provide the function as default, even if the user has not subscribed the deferred message notification, the deferred message notification will be sent to the user after he gets online; if providing the function is not default, the user has to subscribe before the deferred message notification can be sent. Whether the notification content is the message list and the meta-data or the deferred message content will be issued directly depends on the setting and operation of the server.

The deferred message includes the meta-data and the content, which can be stored in the same deferred message storage entity or stored independently, i.e. the meta-data is stored in the IM XDMS and the content is stored in the deferred message storage entity.

Figure 4:
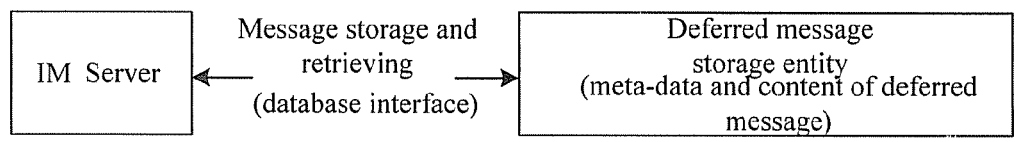
FIG. 4 is a schematic diagram showing meta-data and a content of the deferred message are combined and stored according to an embodiment of the present invention.

FIG. 4 shows the combination and storage of the deferred message data in accordance with one embodiment of the presently described technology. The deferred message meta-data and the deferred message content are stored in the same deferred message storage entity and the IM server only needs to reach one deferred message storage entity before retrieving the deferred message data. The interface between the IM server and the deferred message storage entity may be a database interface.

Figure 5:
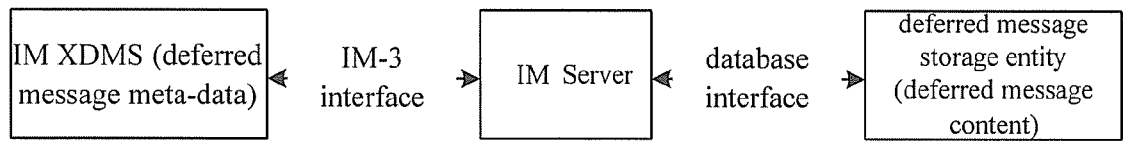
FIG. 5 is a schematic diagram showing meta-data and a content of the deferred message are stored independently according to an embodiment of the present invention.

FIG. 5 shows the case of storing the deferred message data independently in accordance with another embodiment of the presently described technology. The meta-data is stored in the IM XDMS and the content is stored in the deferred message storage entity. The interface between the IM server and the deferred message storage entity may be a database interface; the interface between the IM server and the IM XDMS is an IN-3 interface defined by OMA and the carrying protocol is XCAP, which can support the management function of the XML document (such as the deferred message meta-data) stored in the IM XDMS through the IM-3 interface, such as the build, modification, obtainment and delete.

When the receiving user gets online, the IM server determines whether to issue the deferred message according to whether the user has subscribed the deferred message notification and to the subscription setting. When the IM server issues the deferred message, it will obtain the meta-data of the message from the deferred message storage entity and then issue it. In different storage technologies, the notification flows can be different.

In addition, if the user has subscribed the deferred message notification, the carrying message is the SIP NOTIFY. If the user has not subscribed, the server defaults to issue the notification and the carrying message is the SIP MESSAGE.

There are four exemplary cases of the deferred message notification process according to different methods for storing messages and different methods for carrying the deferred message notification.

Figure 6:
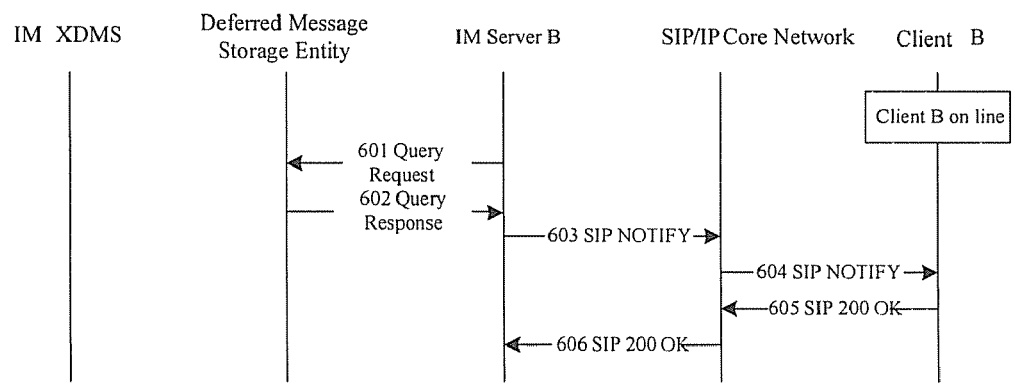
FIG. 6 is a signaling flow chart showing the process of notifying of deferred messages when meta-data and a content of the deferred message are combined and stored and a user has subscribed a deferred message notification according to an embodiment of the present invention.

Case one: FIG. 6 shows the notification flow of the deferred message when a meta-data and a content of the deferred message are combined and stored and a user has subscribed a deferred message notification. Referring to FIG. 6, the deferred message notification process can be described as follows:

Step 601. When the IM server B detects the client B of the receiving user gets online, it decides to issue the deferred message notification to the client B and queries the deferred message meta-data content on the deferred message storage entity, wherein the query request may be done through the database interface provided by the database (such as Oracle and DB2) of the storage logic entity.

Step 602. The deferred message storage entity returns a query result to the IM server B through the database interface.

Step 603. The IM server B constructs an SIP NOTIFY message according to the returned query result and sends the message to the SIP/IP core network, wherein the SIP NOTIFY message carries the deferred message list and deferred message meta-data such as "User B, you have X number of Ims, mainly information listed as: ************."

Step 604. The SIP/IP core network forwards the SIP NOTIFY message to the client B.

Step 605. The client B returns an SIP 200 OK message to the SIP/IP core network, to acknowledge receipt of the SIP NOTIFY message.

Step 606. The SIP/IP core network forwards the SIP 200 OK message to the IM server B.

Figure 7:
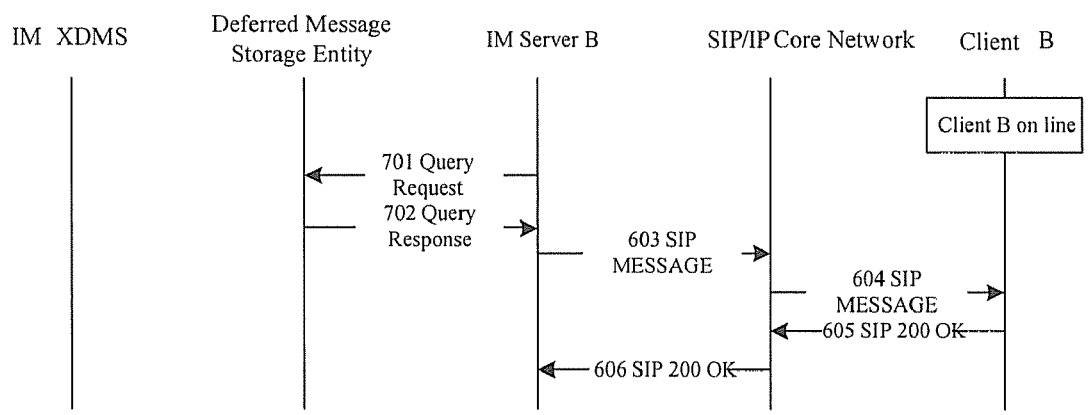
FIG. 7 is a signaling flow chart showing the process of notifying of deferred messages when meta-data and a content of the deferred message are combined and stored and a user hasn't subscribed a deferred message notification according to an embodiment of the present invention.

Case two: FIG. 7 shows an exemplary case when a meta-data and a content of the deferred message are combined and stored and a user has not subscribed a deferred message notification but the IM server defaults to issue the deferred message notification. The notification flow shown in FIG. 7 is similar with that in FIG. 6, and the differences are described as follows:

In step 703, the IM server B sends an SIP MESSAGE, which means to issue the deferred message notification, to the SIP/IP core network, wherein the SIP URI address of the client B is specified in the Request URI and the feature code of the SIP/SIMPLE IM service is included in the "Accept-Contact" of the message such as the "+g.oma.sip-im". The deferred message list and meta-data can be carried in the message body such as the "User B, you have X number of IMs, mainly information listed as: ************."

In step 704, the SIP/IP core network forwards the SIP MESSAGE message to the client B according to the SIP URI address included in the message.

Figure 8:
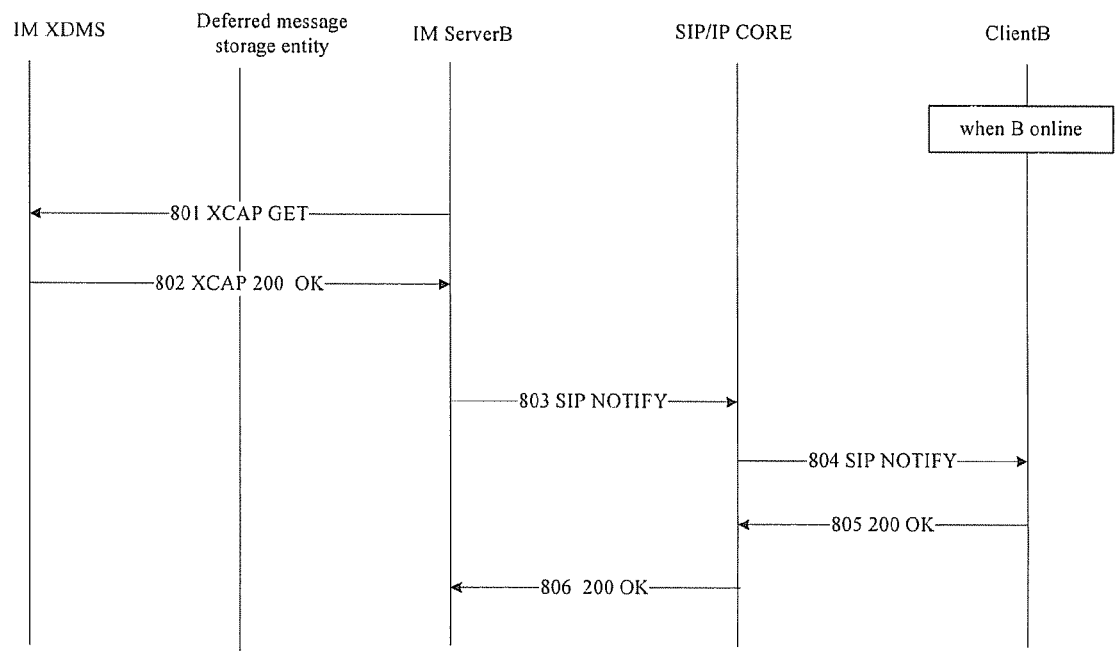
FIG. 8 is a signaling flow chart showing the process of notifying of deferred messages when meta-data and a content of the deferred message are stored independently and a user has subscribed a deferred message notification according to an embodiment of the present invention.

Case three: FIG. 8 shows the notification flow of the deferred message when a meta-data and a content of the deferred message are stored independently and a user has subscribed a deferred message notification. Referring to FIG. 8, the deferred message notification process can be described as follows:

Step 801. When the IM server B detects the client B of the receiving user gets online, it decides to issue the deferred message notification to the client B and issues an XCAP GET request to the IM XDMS for the deferred message meta-data of the client B, wherein the request URI in the XCAP GET request is set to be the URI of the deferred message meta-data XML, document.

Step 802. The IM XDMS queries the related deferred message meta-data and if the query is successful, an XCAP 200 OK response is returned to the IM server B and the query result is included in the XCAP 200 OK response.

Step 803. The IM server B transforms the XCAP 200 OK message into an SIP NOTIFY message and sends it to the SIP/IP core network, wherein the SIP NOTIFY message carries the deferred message list and the meta-data such as the "User B, you have X number of IMs, mainly information listed as: ************."

Step 804. The SIP/IP core network forwards the SIP NOTIFY message to the client B.

Step 805. The client B returns a SIP 200 OK message to the SIP/IP core network, to acknowledge receipt of the SIP NOTIFY message.

Step 806. The SIP/IP core network forwards the SIP 200 OK message to the IM server B.

Figure 9:
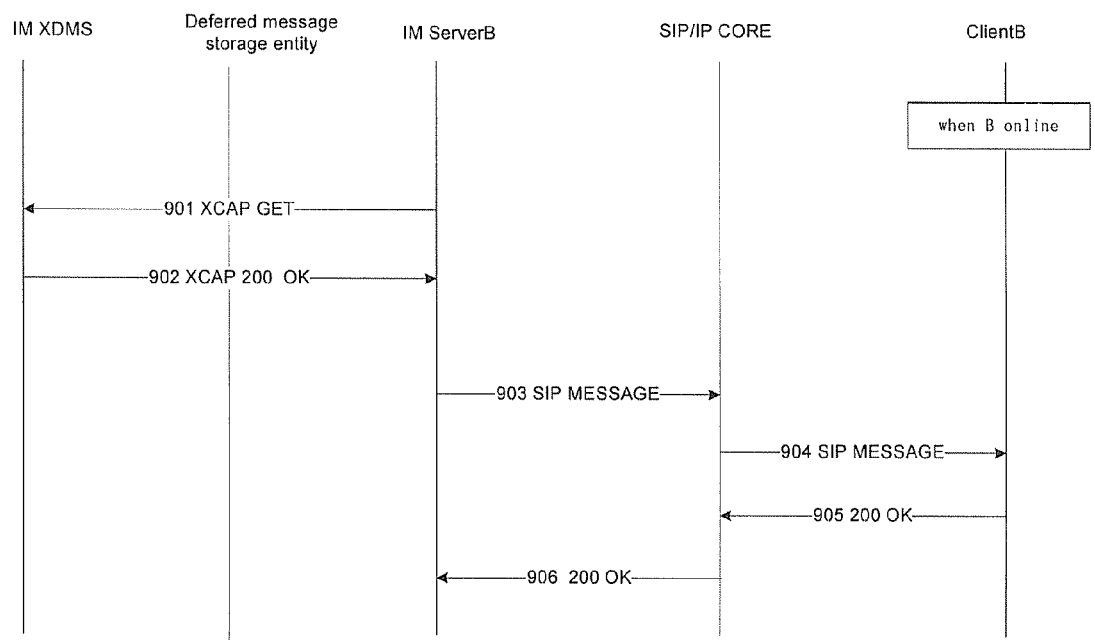
FIG. 9 is a signaling flow chart showing the process of notifying of deferred messages when meta-data and a content of the deferred message are stored independently and a user has not subscribed a deferred message notification according to an embodiment of the present invention.

Case four: FIG. 9 shows an exemplary case when a meta-data and a content of the deferred message are stored independently and a user has not subscribed a deferred message notification, but the IM server defaults to issue the deferred message notification. The notification flow shown in FIG. 9 is similar with that in FIG. 8, and the differences are as follows.

In step 903, the IM server B sends an SIP MESSAGE, which means to issue the deferred message notification, to the SIP/IP core network, wherein the SIP URI address of the client B is specified in the Request URI and the feature code of the SIP/SIMPLE IM service is included in the "Accept-Contact" of the message such as the "+g.oma.sip-im". The deferred message list and meta-data are carried in the message body such as the "User B, you have X number of IMs, mainly information listed as: ************."

In step 904, the SIP/IP core network forwards the SIP MESSAGE message to the client B according to the SIP URI address included in the message.

When the client of the receiving user receives the deferred message notification, the user may choose to obtain some message contents according to some strategy and then the client may send a retrieving request to the IM server for the specific message content chosen at the interface of the terminal.

The retrieving strategy may include, for example, retrieving some messages randomly, retrieving the message according to the sender, the sending time, the size of the message or the combination of the above.

The carrying protocol of the retrieving request may be the SIP, or the MSRP or the HTTP, etc.

When the IM server receives the retrieving request from the client, it needs to read the content of the chosen deferred message from the deferred message storage entity and then issues it to the client. The carrying protocol of the message issuing interface may be the SIP, or the MSRP or the HTTP, etc.

There are two manners for issuing the message.

Figure 10:
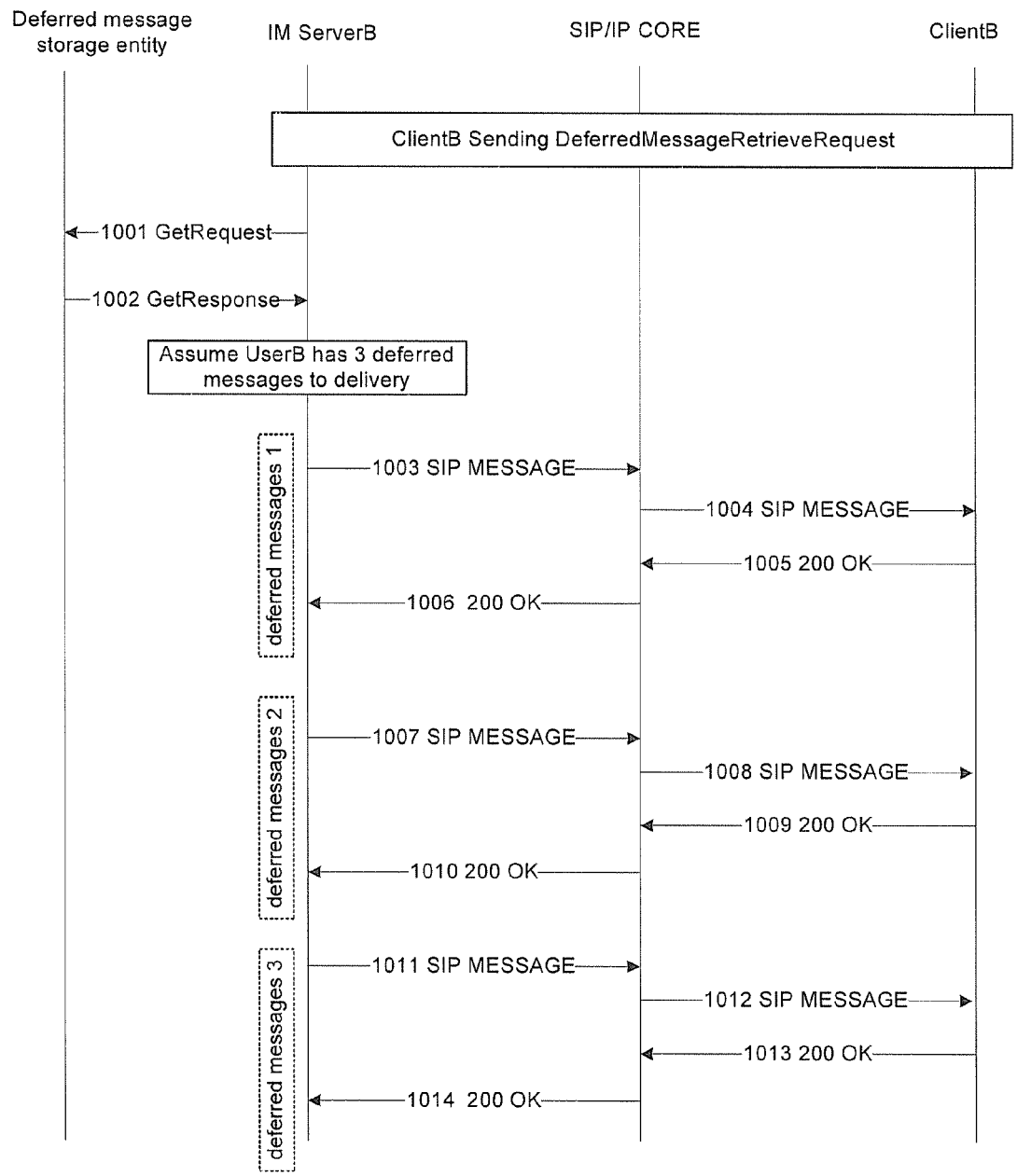
FIG. 10 is a signaling flow chart showing the IM server issues the deferred messages piece by piece according to an embodiment of the present invention.

Manner one: the messages are issued one by one, i.e. the IM server can only issue one deferred message content at one time. The flow can be described with reference to the carrier of SIM MESSAGE. FIG. 10 shows the IM server issues the deferred messages one by one in accordance with one embodiment of the present technology.

Step 1001. When the IM server B detects the client B of the receiving user gets online, it queries the deferred message content on the deferred message storage entity according to the retrieving strategy in the query request, wherein the query request may be done through the database interface provided by the database (such as Oracle and DB2) of the storage logic entity.

Step 1002. The deferred message storage entity returns the query result to the IM server B through the database interface, supposing the user B has three deferred messages.

Step 1003. The IM server B sends the SIP MESSAGE, which means to issue the content of the first deferred message, to the SIP/IP core network, wherein the SIP URI address of the client B is appointed in the Request URI and the feature code of the SIP/SIMPLE IM service is included in the "Accept-Contact" of the message such as the "+g.oma.sip-im"; the content of the first deferred message is carried in the message body.

Step 1004. The SIP/IP core network forwards the SIP MESSAGE message to the client B according to the SIP URI address included in the message.

Step 1005. The client B returns the SIP 200 OK message to the SIP/IP core network, to acknowledge receipt of the SIP MESSAGE message.

Step 1006. The SIP/IP core network forwards the SIP 200 OK message to the IM server B.

Step 1007. The IM server B sends the SIP MESSAGE, which means to issue the content of the second deferred message, to the SIP/IP core network, wherein the SIP URI address of the client B is appointed in the Request URI and the feature code of the SIP/SIMPLE IM service is included in the "Accept-Contact" of the message such as the "+g.oma.sip-im"; the content of the second deferred message is carried in the message body.

Step 1008. The SIP/IP core network forwards the SIP MESSAGE message to the client B according to the SIP URI address included in the message.

Step 1009. The client B returns the SIP 200 OK message to the SIP/IP core network, to acknowledge receipt of the SIP MESSAGE message.

Step 1010. The SIP/IP core network forwards the SIP 200 OK message to the IM server B.

Step 1011. The IM server B sends the SIP MESSAGE, which means to issue the content of the third deferred message, to the SIP/IP core network, wherein the SIP URI address of the client B is appointed in the Request URI and the feature code of the SIP/SIMPLE IM service is included in the "Accept-Contact" of the message such as the "+g.oma.sip-im"; the content of the third deferred message is carried in the message body.

Step 1012. The SIP/IP core network forwards the SIP MESSAGE message to the client B according to the SIP URI address included in the message.

Step 1013. The client B returns the SIP 200 OK message to the SIP/IP core network, to acknowledge receipt of the SIP MESSAGE message.

Step 1014. The SIP/IP core network forwards the SIP 200 OK message to the IM server B.

In the above steps, step 1007 does not have to be after step 1006, and it can be performed after step 1003, for example. Step 1011 does not have to be after step 1010, and it can be after step 1003, for example.

Manner two: a plurality of messages are issued at one time, i.e. the IM server can issue the contents of a plurality of deferred messages at one time.

Figure 11:
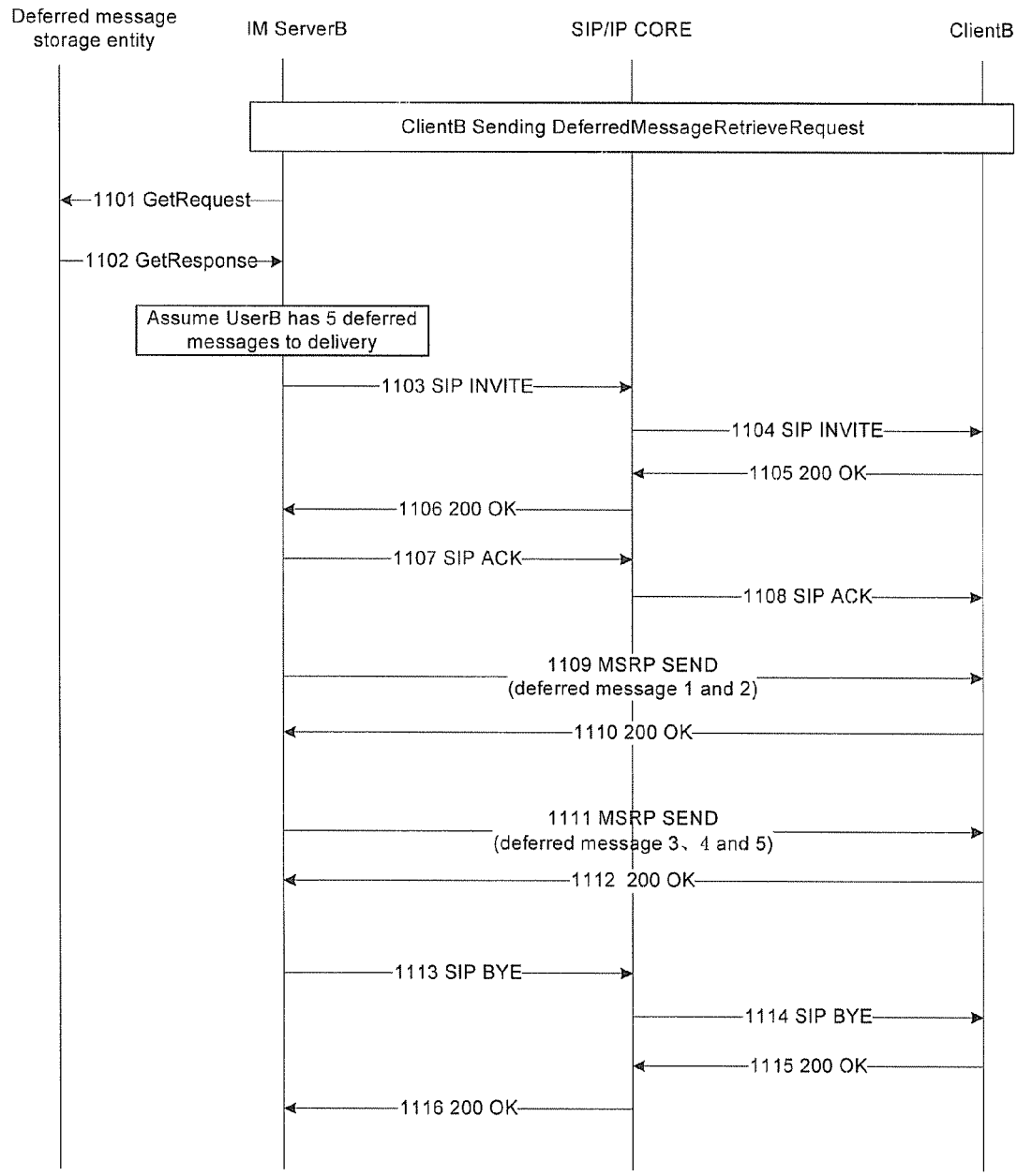
FIG. 11 is a signaling flow chart showing the IM server combines several pieces of deferred messages and issues them at one time according to an embodiment of the present invention.

The flow can be described with reference to the carrier of MSRP. FIG. 11 shows the IM server issues the contents of a plurality of deferred messages at one time in accordance with another embodiment of the present technology.

Step 1101. When the IM server B detects the client B of the receiving user gets online, it queries the deferred message content on the deferred message storage entity according to the retrieving strategy in the query request, wherein the query request may be done through the database interface provided by the database (such as Oracle and DB2) of the storage logic entity.

Step 1102. The deferred message storage entity returns the query result to the IM server B through the database interface, supposing the user B has five deferred messages.

Step 1103. The IM server B sends an SIP INVITE message to the SIP/IP core network for establishing an MSRP channel to the client B so as to send the stored deferred messages to the client B.

Step 1104. The SIP/IP core network forwards the SIP INVITE message to the client B.

Step 1105. The client B returns a SIP 200 OK message to the SIP/IP core network, to acknowledge receipt of the SIP INVITE message.

Step 1106. The SIP/IP core network forwards the SIP 200 OK message to the IM server B.

Step 1107. The IM server B acknowledges receipt of the SIP 200 OK message and sends a SIP ACK message to the SIP/IP core network.

Step 1108. The SIP/IP core network forwards the SIP ACK message to the IM server B. Thus, the MSRP channel is established.

Step 1109. The IM server B sends an MSRP SEND message to the client B through the MSRP channel, wherein the MSRP SEND message carries the contents of the deferred messages 1 and 2 so that the deferred messages 1 and 2 are combined to be sent.

Step 1110. The client B sends an MSRP 200 OK message to the IM server B, to acknowledge the client has received the message.

Step 1111. The IM server B sends an MSRP SEND message to the client B through the MSRP channel, wherein the MSRP SEND message carries the contents of the deferred messages 3, 4 and 5 so that the deferred messages 3, 4 and 5 are combined and sent.

Step 1112. The client B sends a MSRP 200 OK message to the IM server B, to acknowledge the client has received the message.

Step 1113. The IM server B sends an SIP BYE message to the SIP/IP core network, requesting for disconnecting the MSRP channel and ending the session.

Step 1114. The SIP/IP core network forwards the message to the client B.

Step 1115. The client B sends an SIP 200 OK message to the SIP/IP core network after receiving the SIP BYE message and the MSRP channel is disconnected between the IM server B and the client B.

Step 1116. The SIP/IP core network forwards the message to the IM server B and the IM server B acquires that the MSRP channel is disconnected between the IM server B and the client B.

In the flow described above and shown in FIG. 11, the IM server first reads the deferred message content and then establishes the MSRP channel to the client. Another method is to first establish the MSRP channel to the client and then read the deferred message content. The flow described in FIG. 12 is similar with that in FIG. 11 and the difference is that after the MSRP channel is established between the IM server B and the client B, the chosen deferred message content is retrieved from the deferred message storage entity and then sent to the client B.

Figure 12:
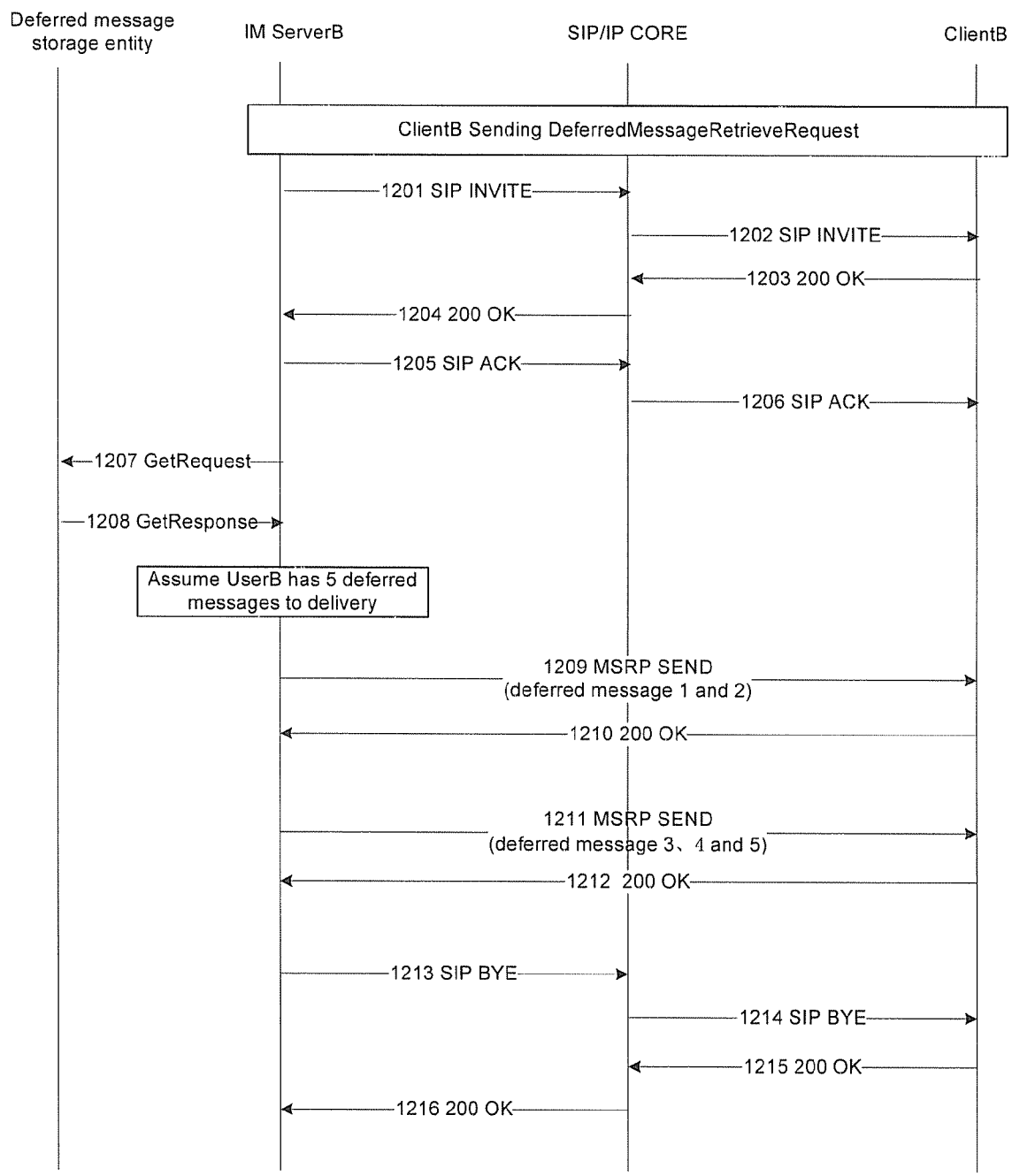
FIG. 12 is a signaling flow chart showing the IM server combines several pieces of deferred messages and issues them at one time according to another embodiment of the present invention.

In the flows described in FIG. 11 and FIG. 12, the IM server determines the number of the deferred messages which can be carried at one time according to the preset of the receiving user B or of the IM system, of the client B's service ability and/or amount of information can be carried by the current MSRP SEND message and sends the deferred messages in the same MSRP SEND message. The deferred messages in the MSRP SEND message are separated with each other so as to be differentiated. It has to be ensured that the sum of the content of the deferred messages is less than the maximum capacity supported by the carrying message. For example, if the deferred messages are issued in the SIP MESSAGE, since the length of the message body is at most 1300 bytes, the sum of the content of the deferred messages cannot exceed 1300 bytes.

If the deferred messages are issued in the MSRP SEND message, in order to guarantee the transmission efficiency, the length of the MSRP message body is at most 2048 bytes. In addition, since the MSRP protocol has the function of combining a plurality of messages, if the message is large, it can be sent in several SEND requests and every SEND request include a part. The above is the transmission mechanism of the MSRP and the IM server doesn't need to perform extra process.

Although illustrative embodiments have been described herein with reference to the accompanying drawings, it should be understood by those skilled in the art that the present invention is not limited to those preferred embodiments, and that various changes and modifications can be made therein without departing from the spirit and the scope of the invention. Thus, it is intended that the present invention covers the modifications and variations of this invention provided they come within the scope of the appended claims and their equivalents.

The invention claimed is:

1. A method for processing deferred messages, applicable in an instant message (IM) system under Session Initiated Protocol (SIP) and Instant Message and Presence Leveraging Extensions (SIMPLE), said method comprising storing the deferred messages, notifying of the deferred messages and retrieving the deferred messages, wherein said storing the deferred messages comprises storing, by the IM system, the deferred messages to be sent to a user in a case that the user pre-requests for storing the deferred messages; where the deferred messages comprise meta-data and content, the meta-data is stored in an IM Extensible Markup Language Document Management Server entity (IM XDMS entity) and the content is stored in a deferred message content storage entity;

said notifying of the deferred messages comprises determining there are deferred messages for the user stored in the IM system by an IM server associated with a client of the user when the user gets online, and sending a deferred message notification to the client of the user under subscribed configuration in a case that the user subscribes the deferred message notification; and said retrieving the deferred messages comprises sending the deferred messages to the client by the IM server in response to a request from the client for retrieving the deferred messages after the client receives the deferred message notification.

2. The method according to claim 1, wherein the user subscribing the deferred message notification further comprises initiating, by the client, a SIP SUBSCRIBE request message for subscribing the deferred message notification to the respective IM server;

authenticating, by said IM server, the user and if the authentication passed, said IM server sending a SIP NOTIFY message to the client, and said SIP NOTIFY message comprising a current deferred message status and the deferred message notification for the user.

3. The method according to claim 2, wherein the SIP SUBSCRIBE request message comprises a subscription event package, in which a deferred message notification content is set.

4. The method according to claim 3, wherein the deferred message notification content comprises deferred message list information and deferred message meta-data.

5. The method according to claim 3, wherein the SIP SUBSCRIBE request message comprises a deferred message notification time.

6. The method according to claim 5, wherein sending the deferred message notification comprises sending the deferred message notification each time the client gets online during a specified period or sending the deferred message notification once only after subscription.

7. The method according to claim 1, wherein if the user subscribes the deferred message notification, the IM server sends the deferred message notification in a SIP NOTIFY message; otherwise, the IM server sends the deferred message notification in a SIP MESSAGE under default setting of the system.

8. The method according to claim 7, wherein the IM server sending the deferred message notification in a SIP MESSAGE under default setting of the IM system comprises: sending, by the IM system, the deferred message notification at a set time or periodically or once only after the client gets online.

9. The method according to claim 8, wherein the deferred message notification content comprises deferred message list information and deferred message meta-data or a deferred message content.

10. The method according to claim 1, wherein if the user subscribes the deferred message notification, when the client gets online, the IM server queries and retrieves the deferred message meta-data for the user from the IM XDMS entity through an IM-3 interface; and then the IM server constructs a deferred message list in accordance with a query result and sends the deferred message notification to the client of the server by a SIP NOTIFY message carrying the deferred message list and the deferred message meta-data.

11. The method according to claim 1, wherein if the user does not subscribe the deferred message notification, when the client gets online, the IM server queries and retrieves the deferred message meta-data for the user from the IM XDMS entity through an IM-3 interface; and then the IM server constructs a deferred message list in accordance with a query result and sends the deferred message notification to the client of the server by a SIP MESSAGE carrying the deferred message list and the deferred message meta-data.

12. The method according to claim 1, wherein after the client receives the deferred message notification, the client initiates a deferred message retrieving request which carries a retrieving condition.

13. The method according to claim 12, wherein the client initiates the deferred message retrieving request through a SIP message, a Hyper Text Transport Protocol (HTTP) message or a Message Session Relay Protocol (MSRP) message in an MSRP channel.

14. The method according to claim 12, wherein the retrieving condition comprises selecting the deferred messages according to a sender, a sending time, or a subject of the messages or a combination thereof or selecting the deferred messages randomly.

15. The method according to claim 12, wherein after the IM server receives the deferred message retrieving request, the IM server sends the deferred message content to the client under the retrieving condition.

16. The method according to claim 15, wherein the IM server sends the deferred message content through a SIP message, a Hyper Text Transport Protocol (HTTP) message or a Message Session Relay Protocol (MSRP) message in an MSRP channel.

17. The method according to claim 16, wherein the IM server incorporates one deferred message content in one sending message; or combines a plurality of deferred message contents in one sending message to send.

18. The method according to claim 17, wherein the plurality of deferred message contents comprises bytes less than or equal to a maximum bytes supported by the sending message.

19. The method according to claim 16, wherein the IM server queries and retrieves the deferred message content for the user from the storage entity which stores the deferred message content through a database interface and then sends the deferred message content.

20. The method according to claim 16, wherein if the MSRP message is adopted to send the deferred message content, the deferred message content is sent through an existing or a newly established MSRP channel between the IM server and the client.

21. The method according to claim 20, wherein sending the deferred message content through a newly established MSRP channel comprises:
- the IM server retrieving the deferred message content for the user and then establishing a new MSRP channel for sending the deferred message content; or
- after receiving the retrieving request for the deferred message from the client, the IM server establishing an MSRP channel with the client and then retrieving and sending the deferred message content for the user.

22. The method according to claim 21, wherein the step of retrieving the deferred message content for the user and then establishing a new MSRP channel for sending the deferred message content further comprises
- after receiving the retrieving request for the deferred message from the client, the IM server querying the deferred message content under the retrieving condition carried in the request and storing the deferred message content locally;
- the IM server sending a SIP request message to the client and requesting to establish an MSRP channel with the client;
- the client returning a SIP response message to the IM server;
- after receiving the SIP response message, the IM server sending a SIP acknowledge message to the client, establishing an MSRP channel with the client and sending the retrieved deferred messages to the client through the MSRP channel.

23. The method according to claim 22, wherein when all the deferred messages are sent, the IM server sends a SIP BYE message to the client of the server; and the client of the server returns a response message.

24. The method according to claim 21, wherein the step of establishing an MSRP channel with the client and then retrieving and sending the deferred message content for the user further comprises
- after receiving the retrieving request for the deferred message from the client, the IM server sending a SIP request message and requesting to establish an MSRP channel with the client;
- the client returning a SIP response message to the IM server;
- after receiving the SIP response message, the IM server sending a SIP acknowledge message to the client, establishing an MSRP channel with the client;
- the IM server querying the deferred message content under the retrieving condition carried in the retrieving request for the deferred message and sending the deferred message content to the client through the established MSRP channel.

25. The method according to claim 24, wherein when all the deferred messages are sent, the IM server sends a SIP BYE message to the client of the server; and the client of the server returns a response message.

26. The method according to claim 1, wherein if the user does not pre-request for storing the deferred messages, when the IM system receives the deferred messages for the user, the system abandons the deferred messages; or processes the deferred messages under default strategy of the IM system.

27. The method according to claim 1, wherein in the step of retrieving the deferred messages, the IM server sends the deferred messages to the client and the client sends a response message to its respective IM server.

28. The method according to claim 27, wherein after receiving the response message from the client, the respective IM server deletes the deferred messages stored in the storage entity.

29. The method according to claim 19, wherein after the IM server retrieves the deferred message content for the client from the storage entity, delete the retrieved messages from the storage entity.

30. The method according to claim 19, wherein after the IM server retrieves the deferred message content for the client from the storage entity, mark the retrieved messages and delete all the marked deferred messages at set time.

31. The method according to claim 1, wherein after the IM server retrieves the deferred message content for the client from the storage entity, set a storage time limit for the retrieved deferred messages in the storage entity, and when storing time of the deferred messages in the system expires by the time limit, delete the deferred messages from the storage entity.

32. An instant message (IM) server for processing deferred messages, applicable under Session Initiated Protocol (SIP) and Instant Message and Presence Leveraging Extensions (SIMPLE), said IM server comprising a storage entity configured to store the deferred messages, a notification entity configured to notify the deferred messages and a retrieving entity configured to retrieve the deferred messages, wherein
- the storage entity configured to store the deferred messages to be sent to a user in a case that the user pre-requests for storing the deferred messages; where the deferred messages comprise meta-data and content, and the meta-data and content are stored separately in different storage entities in the step of storing the deferred messages, the meta-data is stored in an IM Extensible Markup Language Document Management Server entity (IM XDMS entity) and the content is stored in a deferred message content storage entity;
- the notification entity configured to determine there are deferred messages for the user stored in the IM server associated with a client of the user when the user gets online, and sending a deferred message notification to the client of the user under subscribed configuration in a case that the user subscribes the deferred message notification; and
- the retrieving entity configured to send the deferred messages to the client by the IM server in response to a request from the client for retrieving the deferred messages after the client receives the deferred message notification.

\* \* \* \* \*